United States Patent
Jun et al.

(10) Patent No.: US 9,359,028 B2
(45) Date of Patent: Jun. 7, 2016

(54) SIX-LEGGED WALKING ROBOT HAVING ROBOTIC ARMS FOR LEGS AND PLURALITY OF JOINTS

(71) Applicant: KOREA INSTITUTE OF OCEAN SCIENCE & TECHNOLOGY, Ansan-si, Gyeonggi-do (KR)

(72) Inventors: Bong-Huan Jun, Daejeon (KR); Jung-Yup Kim, Seongnam-si (KR); Jin-Yeong Park, Daejeon (KR); Hyung-Won Shim, Daejeon (KR); Bang-Hyun Kim, Daejeon (KR); Hyuk Baek, Daejeon (KR); Pan-Mook Lee, Daejeon (KR)

(73) Assignee: Korea Institute of Ocean Science & Technology, Ansan-si (KR)

( * ) Notice: Subject to any disclaimer, the term of this patent is extended or adjusted under 35 U.S.C. 154(b) by 0 days.

(21) Appl. No.: 14/375,398

(22) PCT Filed: Apr. 25, 2013

(86) PCT No.: PCT/KR2013/003588
§ 371 (c)(1),
(2) Date: Jul. 29, 2014

(87) PCT Pub. No.: WO2013/172565
PCT Pub. Date: Nov. 21, 2013

(65) Prior Publication Data
US 2015/0041227 A1   Feb. 12, 2015

(30) Foreign Application Priority Data
May 17, 2012   (KR) .................. 10-2012-0052411

(51) Int. Cl.
*B62D 57/028*   (2006.01)
*B62D 57/032*   (2006.01)

(52) U.S. Cl.
CPC ............. *B62D 57/032* (2013.01); *Y10S 901/01* (2013.01)

(58) Field of Classification Search
CPC ........................... B62D 57/032; Y10S 901/01
USPC ...................................... 180/7.1, 10
See application file for complete search history.

(56) References Cited

U.S. PATENT DOCUMENTS 4,738,583 A * 4/1988 Macconochie ............ B25J 5/00
                                                        180/8.6
6,922,610 B2 * 7/2005 Okamoto et al. ............. 700/245
(Continued)

FOREIGN PATENT DOCUMENTS

DE   102004016345 A1   10/2005
JP   59-152080 A   8/1984
(Continued)

OTHER PUBLICATIONS

International Search Report, corresponding to PCT/KR2013/003588, dated Jul. 22, 2013, 6 pp.
(Continued)

*Primary Examiner* — Joseph Rocca
*Assistant Examiner* — Marlon Arce
(74) *Attorney, Agent, or Firm* — Lewis Roca Rothgerber Christie LLP (57) ABSTRACT

Disclosed is a hexapod walking robot having a robot arm combined with a leg and a plurality of joints. The hexapod walking robot having a robot arm combined with a leg and a plurality of joints includes a robot body; a plurality of legs installed to the robot body such that the legs have various degrees of freedom; and at least one grip unit installed to at least one of the legs such that at least one grip unit is foldable.

7 Claims, 9 Drawing Sheets

(56) References Cited

U.S. PATENT DOCUMENTS

| | | | | |
|---|---|---|---|---|
| 7,996,112 B1 * | 8/2011 | Behar | ................. | B62D 57/032 |
| | | | | 414/680 |
| 2010/0162846 A1 | 7/2010 | Lee et al. | | |
| 2014/0343728 A1 * | 11/2014 | Jun et al. | ....................... | 700/259 |

FOREIGN PATENT DOCUMENTS

| | | |
|---|---|---|
| JP | 05-200682 A | 8/1993 |
| JP | 11-004956 A | 1/1999 |
| JP | 2000-296484 A | 10/2000 |
| JP | 2001-121459 A | 5/2001 |
| JP | 2005-081447 A | 3/2005 |
| JP | 3870257 | 1/2007 |
| JP | 2007-090493 A | 4/2007 |
| JP | 2008-119820 | 5/2008 |
| JP | 2008-232360 A | 10/2008 |
| KR | 10-0873723 | 12/2008 |
| KR | 20-0449749 | 8/2010 |
| KR | 10-2011-0017672 | 2/2011 |

OTHER PUBLICATIONS

Jun, et al., "A New Concept and Technologies of Multi-Legged Underwater Robot for High Tidal Current Environment" In: Underwater technology, 2011 IEEE Symposium on and 2011 Workshop on Scientific Use of Submarine Cables and eRelated Technologies, Tokyo: IEEE, Apr. 20, 2011, pp. 1-4.

Press Release "Launch of developing an undersea robot which works in sea while walking on sea floor" Ministry of Land, Transport and Maritime Affairs, Apr. 19, 2010, 5 pages, and English translation 6 pages.

Japanese Office Action dated Jun. 2, 2015 in corresponding Japanese Patent Application No. 2014-555511, 4 pages (English Translation, 9 pages).

* cited by examiner

SIX-LEGGED WALKING ROBOT HAVING ROBOTIC ARMS FOR LEGS AND PLURALITY OF JOINTS

CROSS-REFERENCE TO RELATED APPLICATION(S)

This application is a National Phase Patent Application and claims priority to and benefit of International Application Number PCT/KR2013/003588, filed on Apr. 25, 2013, which claims priority to and benefit of Korean Patent Application Number 10-2012-0052411, filed on May 17, 2012, the entire disclosures of which are incorporated herein by reference.

TECHNICAL FIELD

The present invention relates a hexapod walking robot having a robot arm combined with a leg and a plurality of joints, which is developed for examining a mechanical control function of a seabed robot, and more particularly, to a hexapod walking robot for land which is developed for examining a technique examinable on land among various techniques required to a seabed robot.

BACKGROUND ART

In general, seabed topography is complex and has marine environmental condition in which a tidal difference is high so that a tidal current is strong (strong tidal current) and visibility is bad (bad visibility).

Human beings cannot easily approach the dangerous marine environment described above.

Thus, an unmanned seabed robot has been used to solve the above problems in the related art, has been widely utilized around the world until now and the utilizing range has been gradually expanded.

One example of the related art is disclosed in Korea Utility Model No. 20-0449749, in which a technique about a seabed robot which can explore a large range of seabed and reduce damage of human life by meat diet fish is disclosed.

However, in recent years, when a seabed structure or a sunken ship is investigated and observed, or marine science research on a shallow sea area is performed, since seabed topography has an irregular shape of the ground, it has been requested to develop a robot which can stably walk and collect samples necessary for research while walking or at a predetermined position.

That is, as described above, a seabed robot requires various techniques such as a seabed walking technique or a postural stabilization technique for preparing disturbance such as tidal current and it is required to develop a technique for testing such techniques on land.

DISCLOSURE

Technical Problem

An object of the present invention is to provide a hexapod walking robot having a robot arm combined with a leg and a plurality of joints.

Technical Solution

According to an aspect of the present invention, there is provided a hexapod walking robot having a robot arm combined with a leg and a plurality of joints.

The hexapod walking robot having a robot arm combined with a leg and a plurality of joints includes a robot body; a plurality of legs installed to the robot body such that the legs have various degrees of freedom; and at least one grip unit installed to at least one of the legs such that at least one grip unit is foldable.

The legs are installed to both sides of the robot body such that a number of the legs at one side about a central line of the robot body correspond to a number of the legs at an opposite side about the central line.

Each of the legs includes a fixing member installed to the robot body; a rotation body rotatably installed in parallel with the fixing member; a first unit leg connected to the rotation body such that the first unit leg is rotated up and down; a second unit leg linked with the first unit leg such that the second unit leg is rotated up and down; and a rotation unit for controlling rotations of the rotation body and the first and second unit legs.

The rotation unit includes a first rotation unit, a second rotation unit and a third rotation unit.

The first rotation unit includes a first horizontal rotation shaft installed to the fixing member; a second horizontal rotation shaft for forming a rotation center of the rotation body; a first tension member for connecting the first and second horizontal rotation shafts to each other; and a first motor for rotating the first horizontal rotation shaft.

The second rotation unit includes a first vertical rotation shaft formed in the rotation body to form a rotation center of the first unit leg; a second vertical rotation shaft installed to the first unit leg in parallel with the first vertical rotation shaft; a second tension member for connecting the first and second vertical rotation shafts to each other; and a second motor for rotating the first vertical rotation shaft.

The third rotation unit includes a first additional vertical rotation shaft installed at a link portion between the first and second unit legs to form a rotation center of the second unit leg; a second additional vertical rotation shaft installed to the first unit leg in parallel with the first additional vertical rotation shaft; a third tension member for connecting the first and second additional vertical rotation shafts to each other; and a third motor for rotating the first additional vertical rotation shaft.

The hexapod walking robot further includes a first tension control member installed to the fixing member; a second tension control member installed to the rotation body; and a third tension control member installed to the first unit leg.

Each of the first to third tension control members includes a tension meter for measuring tension values of the first to third tension members; a pressing member closely adhering to the first to third tension members so as to move as pressure is applied thereto; and a controller for controlling a movement of the pressing member such that a measured tension value corresponds to a preset reference tension value.

The grip unit includes a fourth rotation unit; a rotation member; and a gripper.

The fourth rotation unit includes a first grip rotation shaft installed to the second leg in parallel with the second additional vertical rotation shaft; a second grip rotation shaft installed to a lower end of the second unit leg; a fourth tension member for connecting the first and second grip rotation shafts to each other; and a fourth motor for rotating the first grip rotation shaft.

One end of the rotation member is rotatably connected to the second grip rotation shaft.

The gripper includes a fixing body installed to an opposite end of the rotation member and having a fifth motor; and a grip installed to the fixing body.

A main gear interworking with a rotation of the fifth motor and a pair of supplementary gears interworking with the main gear are installed to the fixing body.

The grip includes a pair of grips, one end of which is connected to the pair of supplementary gears such that the pair of grips interworks with the pair of supplementary gears.

The hexapod walking robot further includes a force-moment sensor installed between the fixing member and the robot body to measure a force generated between the fixing member and the robot body, wherein a first load cell is installed to one end of the rotation member.

A second load cell is installed to a lower end of the second unit leg which does not have the grip unit to measure a pressure value generated between a sea floor of seabed and the lower end of the second unit leg.

The controller receives the force measured by the force-moment sensor and the pressure value measured by the first and second load cells and controls the first to third motors to control a posture of the robot body such that a center of gravity of the robot body is balanced according to an angle of a ground on which the legs stand.

A receiving space is formed in the second unit leg and the grip is received in the receiving space in a folded state.

The controller is connected to a work instruction selecting unit for transmitting a working signal or a walking signal to the controller.

The controller allows the rotation member to escape out of the receiving space by using the fourth and fifth motors and allows the grip to perform a grip operation when the controller receives the working signal from the work instruction selecting unit, and the controller allows the rotation member to be placed in the receiving space when the controller receives the walking signal from the work instruction selecting unit.

The legs include side legs including plural pairs of side legs installed at both sides of the robot; and working legs including a pair of working legs installed to one end of the robot, wherein the grip unit is foldably installed to the second unit leg of each working leg.

BEST MODE

Mode for Invention

Hereinafter, the configuration and operation of a hexapod walking robot having a robot arm combined with a leg and a plurality of joints according to the present invention will be described with reference to accompanying drawings.

Figure 1:
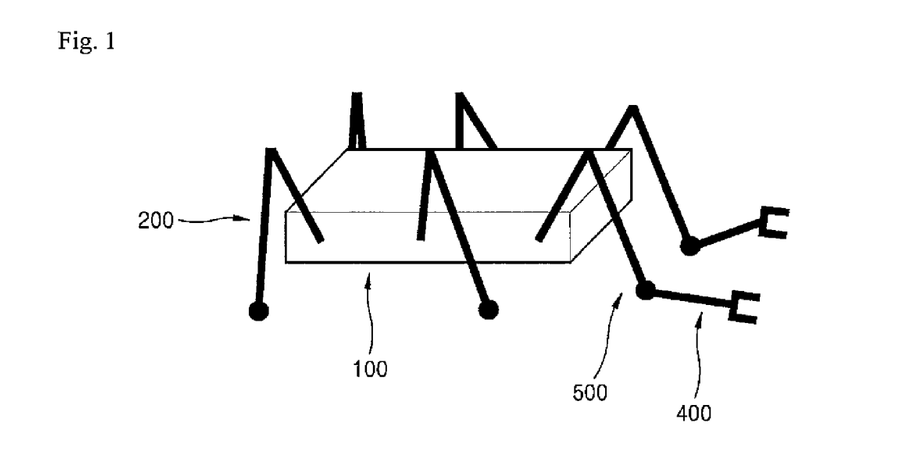
FIG. 1 is a schematic view showing a structure of a hexapod walking robot having a robot arm combined with a leg and a plurality of joints according to the present invention.
Figure 2A:
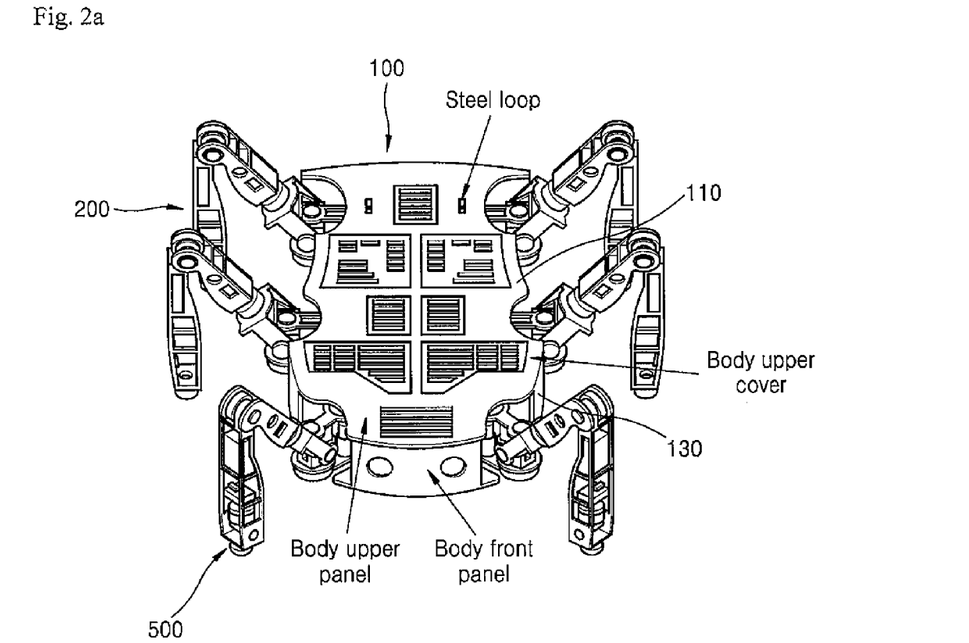
FIG. 2a is a perspective view showing a hexapod walking robot having a robot arm combined with a leg and a plurality of joints according to the present invention.
Figure 2B:
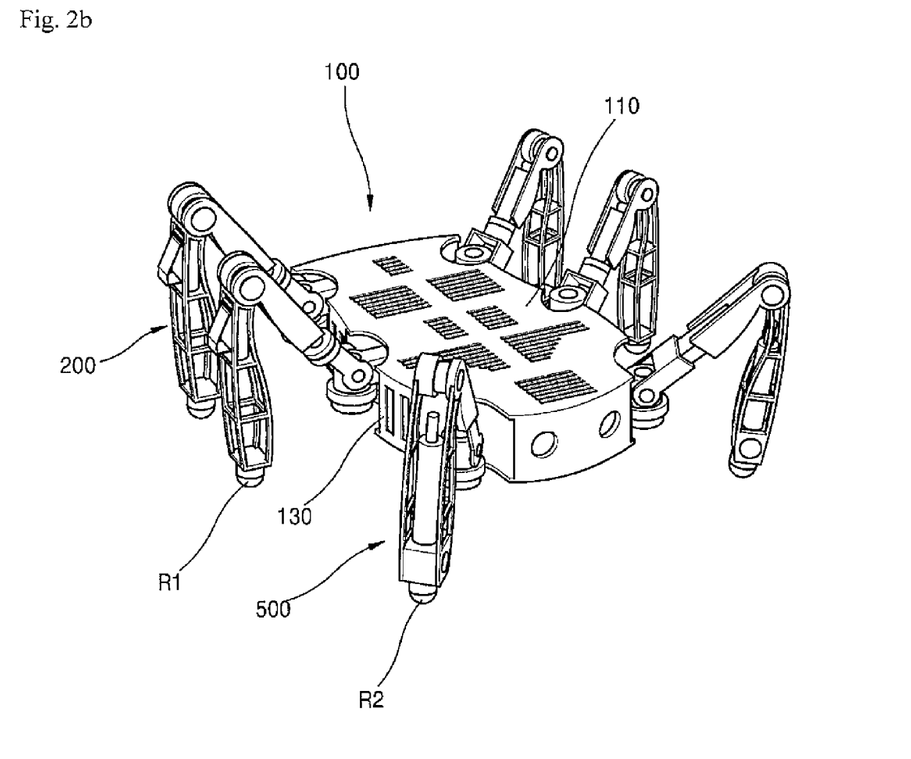
FIG. 2b is a photographic view of a hexapod walking robot having a robot arm combined with a leg and a plurality of joints according to the present invention.
Figure 3:
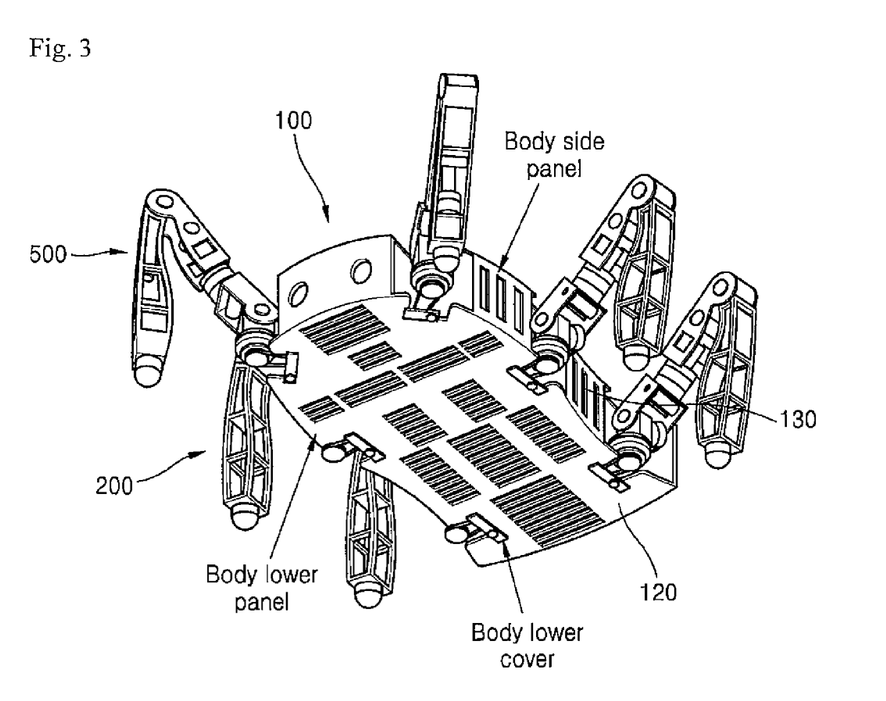
FIG. 3 is a perspective view showing a hexapod walking robot having a robot arm combined with a leg and a plurality of joints according to the present invention.

FIG. 1 is a schematic view showing a structure of a hexapod walking robot having a robot arm combined with a leg and a plurality of joints according to the present invention. FIG. 2a is a perspective view showing a hexapod walking robot having a robot arm combined with a leg and a plurality of joints according to the present invention. FIG. 2b is a photographic view of FIG. 2a. FIG. 3 is a perspective view showing a hexapod walking robot having a robot arm combined with a leg and a plurality of joints according to the present invention.

Referring to FIGS. 1 to 3, a hexapod walking robot having a robot arm combined with a leg and a plurality of joints according to the present invention substantially includes a robot body 100, a plurality of legs 200 and 500, and a grip unit 400.

The robot body 100 includes upper and lower panels 110 and 120 having top and bottom ends having corrosion resistance, and a side panel 130 placed between the upper and lower panels and having corrosion resistance.

The side panel 130 is partly cut in order to allow one ends of the legs 200 and 500 to be installed thereto.

A control panel (not shown), which may receive information obtained through a sensor (not shown) while the robot works on seabed, may be installed in the robot body 100. The control panel is waterproofed in the robot body 100. Of course, the robot body 100 may have a waterproof function in itself.

As shown in FIG. 1, the plurality of legs 200 and 500 are installed at an outside circumference of the robot body 100 such that the legs 200 and 500 have various degrees of freedom.

The legs 200 and 500 include two pairs of side legs 200 and one pair of working legs 500.

The side legs 200 have configurations equal to each other. The working legs 500 also have configurations equal to each other.

Thus, the total number of legs 200 and 500 according to the present invention is six. The six legs 200 and 500 are installed at both sides of the robot body 100 by the three legs.

Hereinafter, the two pairs of side legs 200 will be described.

Side Leg 200

Figure 4:
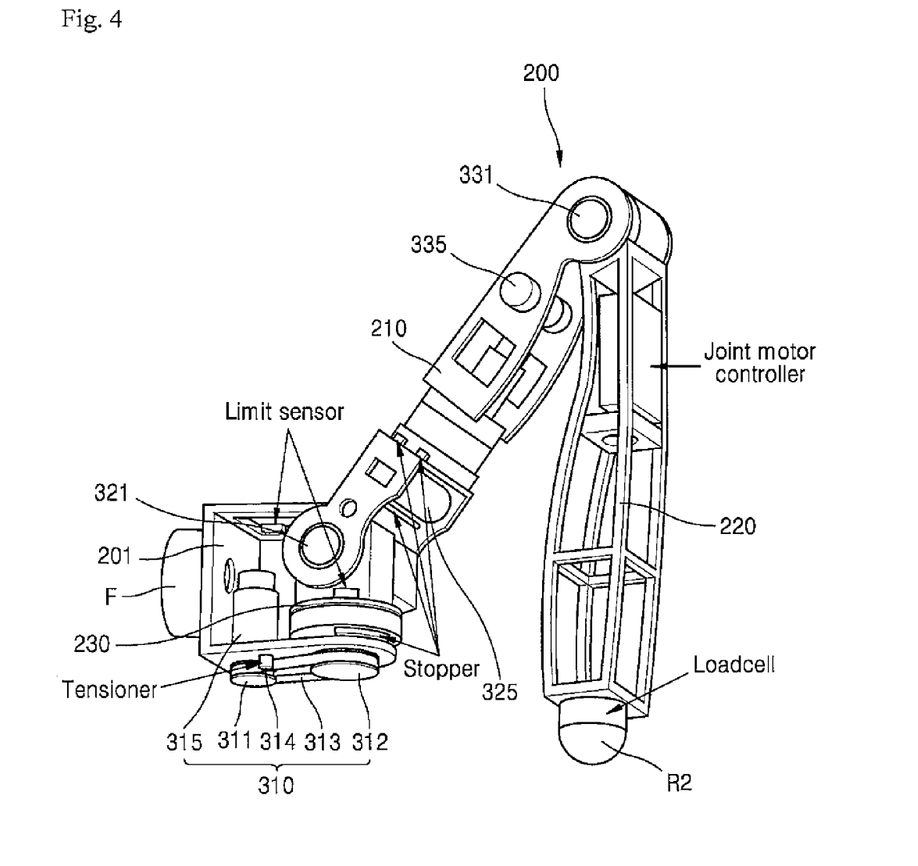
FIG. 4 is a perspective view showing a side leg according to the present invention.
Figure 5:
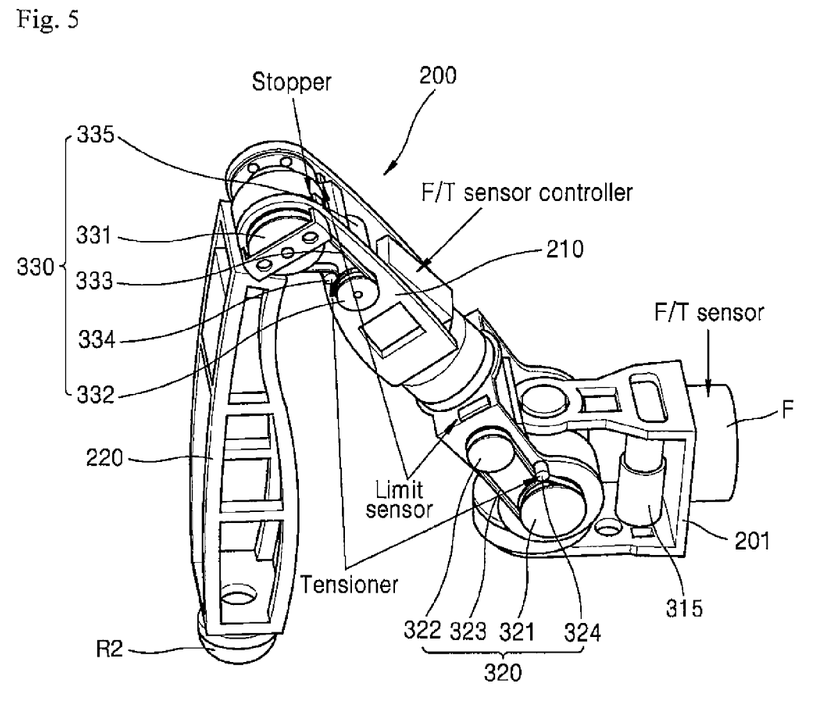
FIG. 5 is another perspective view showing the side leg according to the present invention.

FIG. 4 is a perspective view showing a side leg according to the present invention. FIG. 5 is another perspective view showing the side leg according to the present invention.

The robot according to the present invention may include the total four side legs 200. Preferably, each of the side legs 200 may have four degrees of freedom.

Referring to FIGS. 4 and 5, the side leg 200 includes a fixing member 201, a rotation body 230, first and second unit legs 210 and 220, and a rotation unit.

The rotation unit includes first, second third rotation units 310, 320 and 330.

The fixing member 201 is installed at a side of the robot body 100, as described above. In this case, a force-moment sensor F is installed to the fixing member 201. The force-moment sensor F is installed between the fixing member 201 and a side of the robot body 100.

The rotation body 230 is installed to the fixing member 201. The rotation body 230 may be rotated on the fixing member 201 in a horizontal direction.

The rotation body 230 is rotated by the first rotation unit 310 in the horizontal direction.

The first rotation unit 310 includes first and second horizontal rotation shafts 311 and 312, a first tension member 313 and a first motor 315.

The first and second horizontal rotation shaft 311 and 312 are installed to the fixing member 201 while being spaced apart from each other along a first axis ① by a predetermined interval.

The second horizontal rotation shaft 312 is connected to a central portion of the rotation body 230 such that the second horizontal rotation shaft 312 becomes the center of the rotation of the rotation body 230.

The first tension member 313 connects the first and second horizontal rotation shafts 311 and 312 to each other. The first tension member 313 may include a belt.

Thus, the first and second horizontal rotation shafts 311 and 312 may interwork with each other by the first tension member 313.

The first horizontal rotation shaft 311 is connected to the first motor 315. The first motor 315 may receive an electrical signal from an outside to rotate the first horizontal rotation shaft 311.

Thus, the second horizontal rotation shaft 312 may be rotated while interworking with the first horizontal rotation shaft 311. In addition, the rotation body 230 may be rotated in the horizontal direction.

One end of the first unit leg 210 is connected to the rotation body 230 and may be installed to be rotated up and down about a second axis ②.

The first unit leg 210 may be rotated up and down by the second rotation unit 320.

The second rotation unit 320 includes first and second vertical rotation shafts 321 and 322, a second tension member 323 and a second motor 325.

The first vertical rotation shaft 321 is installed on the rotation body 230 along the second axis ②. One end of the first unit leg 210 is connected to the first vertical rotation shaft 321 to be rotatable up and down.

The second vertical rotation shaft 322 is installed to the first unit leg 210 at the position spaced apart from the first vertical rotation shaft 321 by a predetermined distance. The second vertical rotation shaft 322 is parallel with the second axis ②.

The second tension member 323 is connected to the first and second vertical rotation shafts 321 and 322. The first and second vertical rotation shafts 321 and 322 may interwork with the second tension member 323.

The second motor 325 is connected to the second vertical rotation shaft 322. The second motor 325 receives an electrical signal from an outside to rotate the second vertical rotation shaft 322. Thus, the first and second vertical rotation shafts 321 and 322 are rotated while interworking with each other.

Thus, the first unit leg 210 may be rotated up and down through the above-described operation.

The second unit leg 220 is linked with an end portion of the first unit leg 210.

The second unit leg 220 may be rotated up and down at the end portion of the first unit leg 210 by the third rotation unit 330.

The third rotation unit 330 includes first and second additional vertical rotation shafts 331 and 332, a third tension member 333 and a third motor 335.

The first additional vertical rotation shaft 331 is installed at a portion linked with the first and second unit legs 210 and 220. Thus, the opposite end of the first unit leg 210 and one end of the second unit leg 220 are connected to each other to be rotatable up and down by the first additional vertical rotation shaft 331. In this case, the first additional vertical rotation shaft 331 is parallel with the second axis ②.

The second additional vertical rotation axis 332 is installed to the first unit leg 210 such that the second additional vertical rotation shaft 332 is spaced apart from the first additional vertical rotation shaft 331 by a predetermined interval. The second additional vertical rotation shaft 332 is parallel with the second axis ②.

The third tension member 333 connects the first and second additional vertical rotation shafts 331 and 332 to each other.

Therefore, the first and second additional vertical rotation shafts 331 and 332 may interwork with each other through the third tension member 333 such that the first and second additional vertical rotation shafts 331 and 332 may be rotated.

The first additional vertical rotation shaft 331 is connected to the third motor 335. The third motor 335 receives an electrical signal from an outside to rotate the first additional vertical rotation shaft 331. Thus, the first and second additional vertical rotation shafts 331 and 332 interwork with each other and are rotated.

The second unit leg 220 has a width which is convex outward from the center of the second unit leg 220 along an opposite end of the second unit leg 220. Practically, the opposite end of the second unit leg 220 lands on the ground of seabed to support the robot body 100.

Thus, as described above, when the second unit leg 220 is convex, stable support force for the robot body 100 may be ensured.

In addition, a first tension control member is installed to the fixing member described above. A second tension control member is installed to the rotation member 230. And, a third tension control member is installed to the first unit leg 210.

The configurations of the first to third tension control members are equal to each other.

Figure 7:
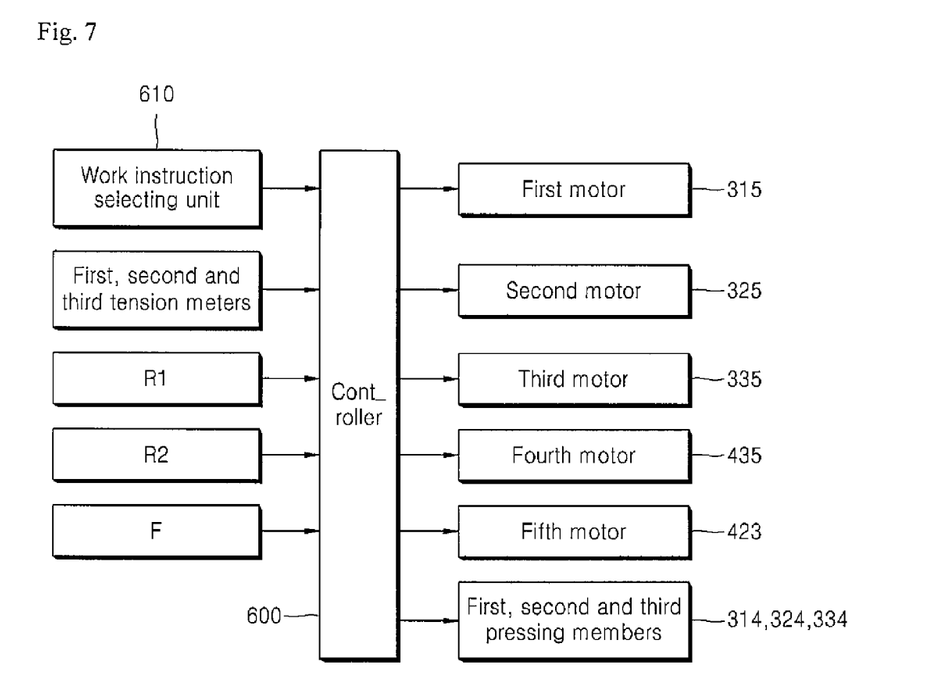
FIG. 7 is a block diagram showing an electrical connecting configuration of a hexapod walking robot having a robot arm combined with a leg and a plurality of joints according to the present invention.

Each of the first to third tension control members may include a tension meter, a pressing member 314, 324 or 334, and a controller 600 (see FIG. 7).

Typically, the tension meter included in the first tension control member measures a tension value of the first tension member 313.

The pressing member 314 includes a roller and is disposed to closely adhere to the circumference of the first tension member 313. In addition, the pressing member 314 includes a cylinder (not shown) which is operated by the controller 600 such that the cylinder is elongated or contracted. The pressing member 314 is disposed to be linearly moveable such that the first tension member 313 is pressed.

The controller 600 may receive the tension value measured to control the movement of the pressing member 314 such that the tension value is equal to a preset reference tension value.

The pressing member 314 may linearly move.

Thus, the first tension member 313 may have a constant tension value through the control of the tension value described above.

In addition, the second and third tension members 323 and 333 may also maintain constant tension values in the same scheme as described above.

Thus, when the rotation body 230 and the first and second unit legs 210 and 220 are rotated, a rotation error range may be easily reduced.

A second load cell R2 is installed to the opposite end of the second unit leg 220. The second load cell R2 may measure the value of pressure generated when the opposite end of the second unit leg 220 stands on the sea floor of seabed.

As described above, the configuration of the side leg 200 has been described. Four side legs 200 are provided and two side legs 200 are disposed at both sides of the robot body 100, respectively, about a central line of the robot body 100.

Working Leg 500

Figure 6A:
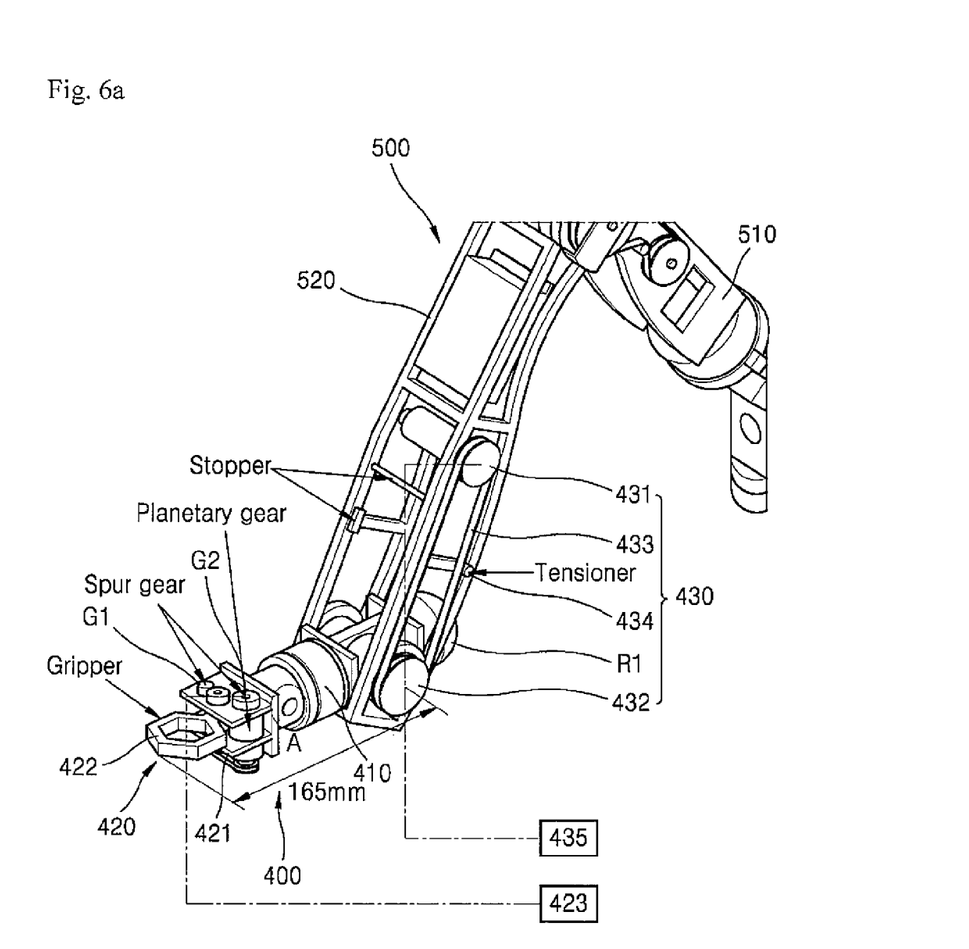
FIG. 6a is a perspective view showing a working leg according to the present invention.
Figure 6B:
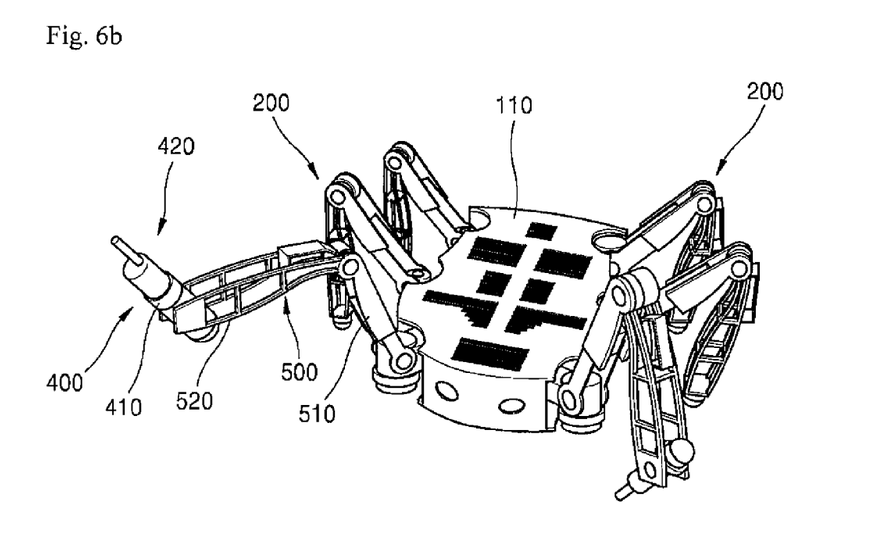
FIG. 6b is a photographic view showing a hexapod walking robot having a robot arm combined with a leg and a plurality of joints, which is in state that two working legs are unfolded.

FIG. 6a is a perspective view showing a working leg according to the present invention. FIG. 6b is a photographic view of the working leg of FIG. 6a.

Referring to FIGS. 6a and 6b, a pair of working legs 500 are provided. The working legs 500 are disposed at one end or a front end of the robot body such that the work legs 500 are spaced apart from each other by a predetermined interval.

The working leg 500 includes a fixing member, a rotation body, first and second unit legs 510 and 520, a rotation unit and a grip unit.

The configurations of the first and second unit legs 510 and 520 may be substantially equal to those of the first and second unit legs 210 and 220 of the side leg 200 described above. The fixing member, the rotation body and rotation unit are also substantially equal to the fixing member 201, the rotation body 230 and the rotation unit of the side leg 200.

Therefore, the descriptions about the first and second unit legs 510 and 520 and the rotation unit will be omitted.

Only, the second load cell R2 is not installed to the opposite end of the second unit leg 520.

A receiving space is formed in the second unit leg 520.

The grip unit 400 includes a fourth rotation unit 430, a rotation member 410 and a gripper 420.

The fourth rotation unit 430 includes first and second grip rotation shafts 431 and 432, a fourth tension member 433 and a fourth motor 435.

The first grip rotation shaft 431 is installed to the second unit leg 520 and is disposed in parallel with the second additional vertical rotation shaft 422. The second grip rotation shaft 432 is installed to a lower end of the second unit leg 520. The first and second grip rotation shafts 431 and 432 are parallel with the second axis ②.

The fourth tension member 433 is connected to the first and second grip rotation shafts 431 and 432.

The first and second grip rotation shafts 431 and 432 may interwork with each other to be rotated.

The fourth motor 435 may receive an electrical signal from an outside to rotate the first grip rotation shaft 431.

One end of the rotation member 410 is rotatably connected to the second grip rotation shaft 432.

Thus, the rotation member 410 may be rotated up and down.

Therefore, when the rotation member 410 is folded, the rotation member 410 is received in the receiving space 521 formed in the second unit leg 520 while being folded. When the rotation member 410 is unfolded, the rotation member 410 is drawn out from the receiving space 521.

In this case, a first load cell R1 for measuring a pressure value is installed to one end of the rotation member 410.

The gripper 420 is installed to the opposite end of the rotation member 410.

The gripper 420, which is installed to the opposite end of the rotation member 410, includes a fixing body 421 having a fifth motor 423 and a grip 422 installed to the fixing body 421.

The grip 422 may be opened or closed and may be a member of performing an operation of tongs.

A main gear G1 interworking with the rotation operation of the fifth motor 423 and a pair of supplementary gears G2 interworking with the main gear G1 are installed to the fixing body 421.

A pair of grips 422 is provided, one ends of which are connected to a pair of supplementary gears G2 to interwork with each other.

In this case, the main gear G1 is connected to one of the pair of supplementary gears G2 engaged with each other.

Thus, when the main gear G1 is rotated by the fifth motor 423, the pair of supplementary gears G2 is rotated at the same time.

The grip, one end of which is connected to the pair of supplementary gears G2, is rotated to be opened or closed, such that the grip 422 may perform an operation of picking up a mineral.

FIG. 7 is a view showing an electrical configuration of a seabed robot according to the present invention.

Meanwhile, referring to FIGS. 4 to 7, the controller 600 described above may receive the pressure values, which are measured by the second load cell R2 installed to the side leg 200 and the first load cell R1 installed to the working leg 500, due to the support of the robot body 100 on the sea floor and the force measured by the force-moment sensor F included in the side leg 200 and the working leg 500, and may control the first to third motors 315 to 335 to control the posture of the robot body 100 such that the robot body 100 is balanced at the center of gravity.

The legs 200 and 500 installed to the robot body 100 may be maintained while being supported on the ground, so that the robot may be stopped when walking or working.

In this case, the first and second load cell R1 and R2 measure the values of pressures generated from the ends of the legs 200 and 500 standing on the ground.

In this case, the force-moment sensors F installed between the robot body 100 and the start portions of the legs 200 and 500 measure the force at the start portion of the leg.

The controller 600 receives the measured force and pressure values transmitted.

The controller 600 may predict an angle or a gradient based on the pressure values and force generated from the ends of the legs 200 and 500.

The controller 600 may calculate corrected forces and pressure values for each leg 200 or 500 to enable the robot body 100 to be balanced at the center of gravity according to the ground angle.

The controller 600 may control the postures of each leg 200 and 500 and the posture of the robot body 100 by using the first to third motors such that each leg 200 or 500 can be maintained with the corrected forces and pressure values.

Thus, the seabed robot according to the present invention may be prevented from tumbling on complex seabed topography when walking or working due to the deviation from the center of gravity.

Meanwhile, the controller 600 is connected to the work instruction selecting unit 610 for transmitting a working signal or walking signal to the controller 600.

When the controller 600 receives the working signal transmitted from the work instruction selecting unit 610, the controller 600 allows the rotation member 410 to escape from the receiving space 521 and allows the grip 422 to perform a grip operation by using the fourth and fifth motors 435 and 423.

When the controller 600 receives the walking signal transmitted from the work instruction selecting unit 610, the controller 600 allows the rotation member 410 to be located in the receiving space 521.

Figure 8:
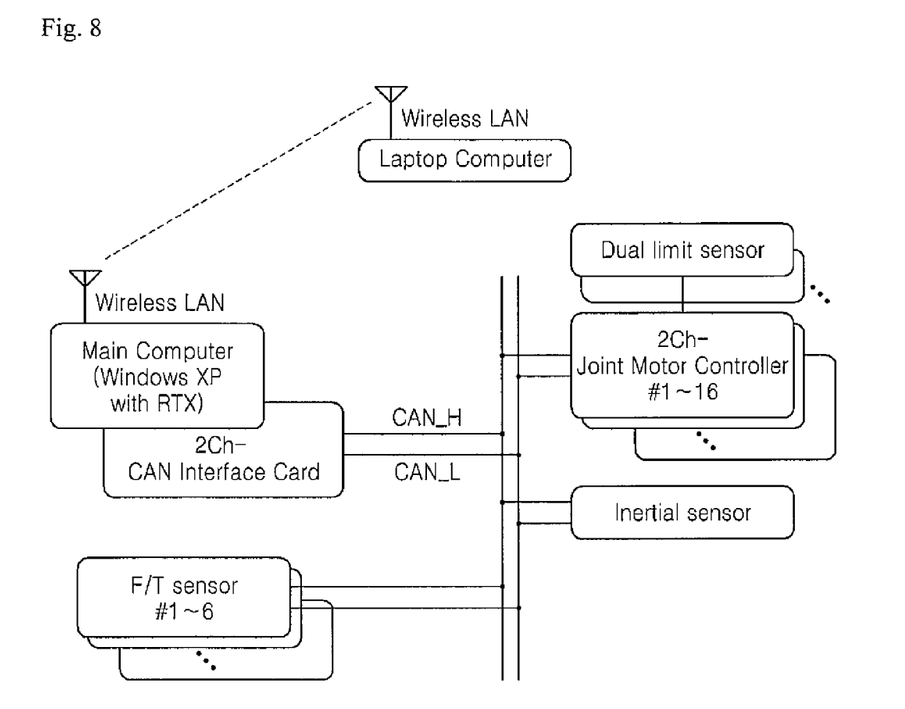
FIG. 8 is a block diagram showing a control system for a hexapod walking robot having a robot arm combined with a leg and a plurality of joints according to the present invention.

Meanwhile, FIG. 8 shows a control system for a hexapod walking robot having a robot arm combined with a leg and a plurality of joints.

A control system for a hexapod walking robot having a robot arm combined with a leg and a plurality of joints according to the present invention includes a remote control laptop computer, a main computer, a CAN interface card, an F/T sensor, an inertial sensor, a joint motor controller, and a dual limit sensor. The F/T sensor is a force-moment sensor described above.

The remote control laptop computer and the main computer communicate with each other through a wireless LAN.

The main computer communicates with the joint motor controller for controlling the operations of the F/T sensor, the inertial sensor and the above-described motors through the CAN interface card connected through PC 104 bus.

The main computer receives an instruction through the wireless LAN from the laptop computer and calculates the input values of each joint motor according to the instruction.

The calculated join motor input values are transmitted to the joint motor controller by CAN communication protocol through the CAN interface card.

The joint motor controller controls the joint motors according to the received joint motor input values. In this case, it is monitored by using a dual limit sensor that the joint angle arrives at a limit range.

While the main computer controls each joint for walking or the grip for working, the force and moment applied to the legs may be measured by using the F/T sensor to determine whether an error occurs in walking or working.

In addition, since the posture and movement of the body may be sensed by using the inertial sensor to recognize the balance state of the body, the control for stabilizing the posture and walking against disturbance may be performed.

As the result of controlling the stabilization against the disturbance, the calculated joint motor input values are transmitted to the joint motor controller again, so that the sequence of control procedure is repeated.

Next, the operation of the hexapod walking robot having a robot arm combined with a leg and a plurality of joints according to the present invention will be described with reference to the above-described configuration.

Referring to FIGS. 2a to 3, various techniques, such as a walking technique and a posture stabilization technique against disturbance, which are requested to the hexapod walking robot having a robot arm combined with a leg and a plurality of joints according to the present invention, may be examined on land.

The lower ends of the side and working legs 200 and 500 provided on the robot body 100 may stand on the ground.

In this case, the rotation member 410 is folded in the receiving space 521 of the second unit leg 520 of the pair of working legs 500.

Thus, the gripper 420 connected to the rotation member 410 is received in the receiving space of the second unit leg 520 in an unused state.

In this state, the second load cell R2 installed to the lower end of the second unit leg 220 of the side leg 200 and the first load cell R1 installed to one end of the rotation member 410 provided in the working leg 500 measure the values of pressure generated when the legs stand on the ground and transmit the measured values to the controller 600. The pressure values correspond to compression forces vertically applied to the ground.

In addition, the force-moment sensors F disposed between the side and working legs 200 and 500 and the robot body 100 measure the force generated when the legs stand on the ground as described above, and transmit the measured force to the controller 600.

The controller 600 may control the first to third motors 315 to 335 to allow the force and the pressure values to be balanced with the center of gravity of the robot body 100 such that the posture of the robot body 100 may be controlled.

Therefore, when the ground is inclined at a predetermined angle to form the inclined ground, the controller 600 changes the postures of the side and working legs 200 and 500 through the motor control described above in order to prevent the robot body 100 from tumbling due to the deviation of the center of gravity of the robot body 100, so that the posture of the robot body 100 may be stabilized.

In addition, when the sea floor is flat or directly exposed due to disturbance such as a tidal current, each force-moment sensor F measures the force on which the disturbance is reflected and transmits the measured force to the controller 600, so that the controller 600 may change the postures of the side and working legs 200 and 500 through the motor control to prevent the robot body 100 from tumbling.

Meanwhile, a walking or working signal may be transmitted to the controller 600 through the work instruction selecting unit 610 according to the present invention.

Thus, the controller 600 may operate the side and working legs 200 and 500 through the motor control to perform the walking operation.

In this case, the second load cell R2 installed to the lower end of the second unit leg 220 of the side leg 200 and the first load cell R1 installed to one end of the rotation member 410 provided in the working legs 500 measure the values of pressure generated while walking on the sea floor and transmit the measured values to the controller 600.

In addition, the force-moment sensors F disposed between the side and working legs 200 and 500 and the robot body 100 measure the force generated while the walking operation is performed as described above, and transmit the measured force to the controller 600.

Then, the controller 600 may control the first to third motors 315 to 335 to allow the force and the pressure values transmitted while walking operation is performed as described above to be balanced with the center of gravity of the robot body 100, such that the posture of the robot body 100 may be controlled.

In case of walking, when the sea floor is inclined or influenced by disturbance such as a tidal current, as described above, the postures of the legs 200 and 500 are controlled through the motor control to prevent the robot body 100 from tumbling while the walking operation is performed.

To the contrary, when the controller 600 receives the working signal, as shown in FIG. 6b, the rotation member 410 is rotated in the pair of working legs 500 installed at the front end of the robot body 100 so that the rotation member 410 may be unfolded from the second unit leg 520.

Thus, the gripper 420, which is freely connected to the end of the rotation member 410, may perform a function of collecting minerals while protruding to an outside.

That is, the controller 600 may allow the rotation member 410 included in the pair of working legs 500 to be rotated by using the fourth motor 435 so that the rotation member 410 may escape out of the receiving space 521 of the second unit leg 520.

Thus, the grip unit 420 according to the present invention may be in an unfolded state in the pair of working legs 500 installed to the front end of the robot body 100.

That is, the grip unit 400 according to the present invention is unfolded from the working leg 500 to perform the work.

In addition, the controller 600 may allow the grip 422 of the gripper 420 to be closed or opened by using the fifth motor 423 so that a work of holding a working object such as minerals may be performed.

Inversely, when the work is completed by using the grip unit 400 and the working signal is stopped, the grip unit 400 is folded in the receiving space 51 formed in the second unit leg 520 of the pair of working legs 500.

That is, the grip unit 400 including the pair of working legs 500 returns to the state before the grip unit 400 is unfolded, that is, the original location.

In this case, as described above, when the grip unit 400 is placed in the receiving space 521 formed in the second unit leg 520 of each working leg 500 while being folded, the posture must be controlled by using the remaining legs 200, that is, the four side legs 200 such that the robot body 100 is prevented from tumbling.

In this case, the controller 600 according to the present invention 600 controls the four side legs 200 through the motor control such that the postures of the four side legs 200 are changed. For example, a part of the robot body 100 is allowed to be raised so that the motion of the robot body 100 may be changed to be inclined from the front end portion to the rear end portion. At this time, the robot body 100 may be supported by the four side legs 200 on the ground.

Then, after the grip unit 400 is folded, the controller 600 changes the postures of the pair of working legs 500 such that the end portion of the rotation member 410 folded in the pair of working legs 500 stands on the ground.

When the pair of working legs 500 stand on the ground, the controller 600 again performs the posture control through the motor control by using the six legs 200 and 500 such that the robot body 100 is prevented from tumbling.

Thus, according to the embodiment of the present invention, the legs are used for walking when the robot walks on the sea floor. When the robot is used for working, the gripper is unfolded in the legs installed at the front end of the robot body, so that the technique of dually using a robot arm necessary for a work may be previously examined on land.

INDUSTRIAL APPLICABILITY

According to the present invention, a seabed walking technique or a postural stabilization technique for preparing disturbance, which is required to a seabed robot, may be previously examined on land.

In addition, according to the present invention, all of the six legs are used in walking and the pair of working legs is used in working by unfolding the grip unit provided to the front end of the robot body, so that the technique may be previously examined on land when the robot works in seabed.

The invention claimed is:

1. A hexapod walking robot having a robot arm combined with a leg and a plurality of joints, the hexapod walking robot comprising:
a robot body;
a plurality of legs installed to the robot body such that the legs have various degrees of freedom; and
at least one grip unit installed to at least one of the legs such that the at least one grip unit is foldable,
wherein each of the legs includes:
a fixing member installed to the robot body;
a rotation body rotatably installed in parallel with the fixing member;
a first unit leg connected to the rotation body such that the first unit leg is rotated up and down;
a second unit leg linked with the first unit leg such that the second unit leg is rotated up and down; and
a rotation unit for controlling rotations of the rotation body and the first and second unit legs,
wherein a receiving space is formed in the second unit leg and the grip unit is received in the receiving space in a folded state,
wherein the rotation unit includes a first rotation unit, a second rotation unit and a third rotation unit,
wherein the first rotation unit includes:
a first horizontal rotation shaft installed to the fixing member;
a second horizontal rotation shaft for forming a rotation center of the rotation body;
a first tension member for connecting the first and second horizontal rotation shafts to each other; and
a first motor for rotating the first horizontal rotation shaft,
wherein the second rotation unit includes:
a first vertical rotation shaft formed in the rotation body to form a rotation center of the first unit leg;
a second vertical rotation shaft installed to the first unit leg in parallel with the first vertical rotation shaft;
a second tension member for connecting the first and second vertical rotation shafts to each other; and
a second motor for rotating the first vertical rotation shaft, and
wherein the third rotation unit includes:
a first additional vertical rotation shaft installed at a link portion between the first and second unit legs to form a rotation center of the second unit leg;
a second additional vertical rotation shaft installed to the first unit leg in parallel with the first additional vertical rotation shaft;
a third tension member for connecting the first and second additional vertical rotation shafts to each other; and
a third motor for rotating the first additional vertical rotation shaft.

2. The hexapod walking robot of claim 1, wherein the legs are installed to both sides of the robot body such that a number of the legs at one side about a central line of the robot body corresponds to a number of the legs at an opposite side about the central line.

3. The hexapod walking robot of claim 1, further comprising:
a first tension control member installed to the fixing member;
a second tension control member installed to the rotation body; and
a third tension control member installed to the first unit leg,
wherein each of the first to third tension control members includes:
a tension meter for measuring tension values of the first to third tension members;
a pressing member closely adhering to the first to third tension members so as to move as pressure is applied thereto; and
a controller for controlling a movement of the pressing member such that a measured tension value corresponds to a preset reference tension value.

4. The hexapod walking robot of claim 3, wherein the grip unit includes a fourth rotation unit; a rotation member; and a gripper,
wherein the fourth rotation unit includes:
a first grip rotation shaft installed to the second leg in parallel with the second additional vertical rotation shaft;

a second grip rotation shaft installed to a lower end of the second unit leg;

a fourth tension member for connecting the first and second grip rotation shafts to each other; and a fourth motor for rotating the first grip rotation shaft, wherein one end of the rotation member is rotatably connected to the second grip rotation shaft, wherein the gripper includes:

a fixing body installed to an opposite end of the rotation member and having a fifth motor; and a grip installed to the fixing body, wherein a main gear interworking with a rotation of the fifth motor and a pair of supplementary gears interworking with the main gear are installed to the fixing body, and wherein the grip includes a pair of grips, one end of which is connected to the pair of supplementary gears such that the pair of grips interworks with the pair of supplementary gears.

5. The hexapod walking robot of claim 4, further comprising a force-moment sensor installed between the fixing member and the robot body to measure a force generated between the fixing member and the robot body, wherein a first load cell is installed to one end of the rotation member, wherein a second load cell is installed to a lower end of the second unit leg which does not have the grip unit to measure a pressure value generated between a sea floor of seabed and the lower end of the second unit leg, wherein the controller receives the force measured by the force-moment sensor and the pressure value measured by the first and second load cells and controls the first to third motors to control a posture of the robot body such that a center of gravity of the robot body is balanced according to an angle of a ground on which the legs stand.

6. The hexapod walking robot of claim 4, wherein the controller is connected to a work instruction selecting unit for transmitting a working signal or a walking signal to the controller, the controller allows the rotation member to escape out of the receiving space by using the fourth and fifth motors and allows the grip to perform a grip operation when the controller receives the working signal from the work instruction selecting unit, and the controller allows the rotation member to be placed in the receiving space when the controller receives the walking signal from the work instruction selecting unit.

7. The hexapod walking robot of claim 6, wherein the legs include side legs including plural pairs of side legs installed at both sides of the robot; and working legs including a pair of working legs installed to one end of the robot, and wherein the grip unit is foldably installed to the second unit leg of each working leg.

* * * * *